United States Patent Office 3,799,801
Patented Mar. 26, 1974

3,799,801
PROCESS FOR THE FINISHING OF TEXTILE MATERIALS
Helmut Kirschnek, Leverkusen, Wilfried Kortmann, Hohenlimburg, and Karl-Heinz Breyer, Leverkusen, Germany, assignors to Bayer Aktiengesellschaft, Leverkusen, Germany
No Drawing. Filed Sept. 8, 1971, Ser. No. 178,805
Claims priority, application Germany, Sept. 8, 1970, P 20 44 372.5; Feb. 25, 1971, P 21 08 903.2
Int. Cl. C08j 1/44
U.S. Cl. 117—139.5 CQ
11 Claims

ABSTRACT OF THE DISCLOSURE

Process for the finishing of textile materials for improving their soil release, oil release and soil redeposition properties wherein are used as finshing agents optionally in combination with known textile finishing agents difunctional polyalkylene glycol ether derivatives of the formula

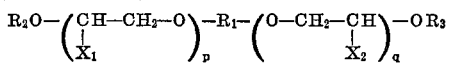

wherein $R_1$, $X_1$, $X_2$, $R_2$, $R_3$, $p$ and $q$ have the meaning stated below.

---

The invention relates to a process for the finishing of textile materials; more particularly it concerns a process for the finishing of textile materials wherein the textile materials are impregnated with solutions or dispersions of difuuctional polyalkylene glycol ether deravtives of the formula

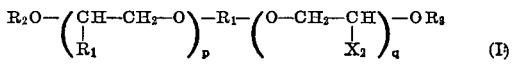

in which $R_1$ stands for the bivalent radical of an aliphatic or cycloaliphatic diol; the radical contains 10 to 22 carbon atoms and may be substituted by chlorine atoms and/or interrupted by hetero atoms, preferably nitrogen or oxygen atoms;
$X_1$ and $X_2$, independently of one another, mean a methyl, ethyl or chloromethyl group, or preferably, a hydrogen atom, with the proviso that at least 60% of the radicals $X_1$ and $X_2$ contained in a molecule stand for hydrogen;
$R_2$ and $R_3$, independently of one another, stand for an organic radical which contains 1 to 3 carbon atoms and can be split off by acidic hydrolysis or, preferably, stand for a hydrogen atom;
$p$ and $q$, independently of one another, stand for a number from 0 to 50, with the proviso that the sum total of $p$ and $q$ amounts to 4 to 50, preferably 4 to 35, the materials are then dried and subsequently subjected to a heat treatment at temperatures of 100 to 200° C.

For $R_2$ and $R_3$ there may be mentioned, as organic radicals which contain 1-3 carbon atoms and can be split off by acidic hydrolysis, for example, the hydroxymethyl, 1-hydroxyethyl-(1), 1-hydroxy-2-oxo-ethyl-(1), formyl, acetyl and propionyl radicals.

The difunctional polyalkylene glycol ether derivatives to be used according to the invention are alkoxylation products of aliphatic or cycloaliphatic diols.

The said compounds are prepared in known manner by reacting 1 mol of the aliphatic diol with 4 to 50 mol alkylene oxide, preferably ethylene oxide, in the presence of alkaline catalysts at elevated temperatures and possibly under excess pressure, or by reacting the diols with epichlorohydrin and subsequently alkoxylating the reaction product.

In many cases it has proved advantageous to replace the aliphatic diol with diol mixtures such as are obtained in the diol synthesis from technical olefines.

In some cases it may also be of advantage to mask the free hydroxyl groups of the alkoxylation products with aliphatic alkylol or acyl groups which contain 1 to 3 carbon atoms and can easily be split off again by acidic hydrolysis. Groups of this type are, for example:
—$CH_2OH$, —$CH(OH)$—$CH_3$, —$CH(OH)$—$CHO$,
—$CHO$
—$CO$—$CH_3$ and —$CO$—$C_2H_1$.

For $R_1$ there may be mentioned, as bivalent radicals of an aliphatic or cycloaliphatic diol which contain 10 to 22 carbon atoms and may be substituted by chlorine atoms and/or interrupted by hetero atoms, for example, the radicals which are derived from the following diols by omitting the two hydroxyl groups:

$C_{10}$–$C_{22}$-alkane-diols, e.g. dodecane-diol-1,2, hexadecane-diol-12,13, octadecane-diol-1,12, eicosane-diol-1,2;
$C_{10}$–$C_{22}$-alkene-diols, e.g. octadecane-(9,10) - diol - 1,12;
chlorosubstituted $C_{10}$–$C_{22}$-alkane-diols, e.g. 9-chloro-octadecane-diol-1,10, 7-chloro-hexadecane-diol-1,8, 13-chloro-docosane-diol-1,14;
aliphatic diols which contain 10 to 22 carbon atoms and may be substituted by chlorine atoms and the carbon chain of which is interrupted by hetero atoms, especially nitrogen and/or oxygen atoms, e.g. glycerol-monoalkyl ethers, such as glycerol-mono-decyl ether or glycerol mono-octadecyl ether; (12-hydroxy-octadecyl)-(3-chloro-2-hydroxy-propyl) ether, 12-hydroxy-stearic acid monoglycol esters; the monoesters of trihydric alcohols, such as glycerol monolaurate or glycerol monostearate; monoalkanolamides of hydroxy-fatty acid, such as N-methyl-N-(2-hydroxy-ethyl)-amide of 12-hydroxystearic acid; fatty acid amides of dihydroxy-alkylamines, such as e.g. palmitoyl-N-ethyl-N-(2,3-dihydroxy-propyl)-amide; carbamates obtainable from alkyl-isocyanates and alkane-trils, e.g. glycerol monostearyl carbamate;
cycloaliphatic $C_{10}$–$C_{22}$-diols, e.g. cyclo-dodecane-diol-1,2 which can be obtained by epoxidation of the corresponding cyclic olefine.

Among the polyalkylene glycol ether derivatives to be used according to the invention, those compounds of the Formula I should be specially mentioned in which $X_1$ and $X_2$, independently of one another, stand for a hydrogen atom of a methyl group, with the proviso that at least 60% of $X_1$ and $X_2$ are hydrogen atoms; and
$R_2$ and $R_3$, independently of one another stand for a hydrogen atom or a methylol group;
the sum total of $p+q$ amounts to 4–35; and
$R_1$ stands for the bivalent radical of an aliphatic diol of the formula

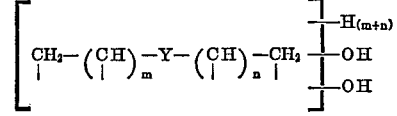

in which Y means —$CH_2$—, —$CH=CH$—, —$O$—,
—$CO$—$O$—, —$CO$—$NH$—, —$CO$—$N(CH_3)$—,
—$CO$—$N(C_2H_5)$—, —$CO$—$N(C_2H_7)$—
or —$NH$—$CO$—$O$—; and $m$ and $n$, independently of one another, stand for a number from 0 to 20, with the proviso that the sum total of $m$ and $n$ amounts to 8 to 20.

Representatives of these compounds are, for example, the alkoxylation products and their methylol derivatives, such as are obtained by the reaction of dodecane-diol-1,4, octadecene - (9,10) - diol-1,12, glycerol-monohexadecyl ether, 12-hydroxy-stearic acid monoglycol ester; the N-(2-hydroxyethyl)amide, N-methyl - N - (2-hydroxyethyl)-amide, N-ethyl-N-(2-hydroxyethyl)- and N-propyl-(2- hydroxyethyl)-amide of 12-hydroxy-stearic acid; or glycerol-monostearyl carbamate, wtih ethylene oxide or with ethylene oxide and propylene oxide; in the mixed alkoxylation products not more than 4 mol propylene oxide should be present for every 6 mol ethylene oxide, examples being the reaction product obtained by reacting 1 mol dodecane diol-1,4 first with 4 mol propylene oxide and subsequently with 15 mol ethylene oxide, or the reaction product obtained by reacting 1 mol decane-diol-1,2 first with 8 mol propylene oxide and subsequently with 20 mol ethylene oxide.

However, those compounds of the Formula I have proved particularly satisfactory, in which $X_1$ and $X_2$ mean a hydrogen atom;
$R_2$ and $R_3$, independently of one another, mean a hydrogen atom or a methylol group; and
$R_1$ stands for the bivalent radical of an aliphatic diol of the formula

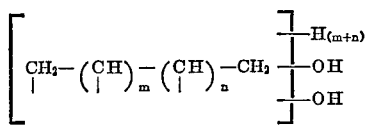

in which $m$ and $n$ independently of one another, stand for a number from 0 to 20, with the proviso that the sum total of $m$ and $n$ amounts to 8 to 20.

As representatives of these compounds, there may be mentioned the ethoxylation products assembled in the following table, as well as their methylol derivatives obtained by the reaction with 1 to 2 mol formaldehyde per mol of ethoxylation product.

| Reaction products of— | |
|---|---|
| Octadecane-diol-1,12 | With 4-25 mol ethylene oxide |
| 9-chloro-octadecane-diol-1,10 | Do. |
| Octadecane-diol-1,4 | Do. |
| Octadecane-diol-1,2 | Do. |
| Octadecane-diol-5,6 | Do. |
| 3-methyl-octadecane-diol-14,15 | Do. |
| 13-chloro-docosane-diol-1,14 | With 8-35 mol ethylene oxide. |
| Docosane-diol-1,4 | Do. |
| Eicosane-diol-1,4 | With 6-30 mol ethylene oxide. |
| Eicosone-diol-1,2 | Do. |
| Eicosane-diol-4,5 | Do. |
| Heptadecane-diol-1,2 | With 4-25 mol ethylene oxide. |
| Heptadecane-diol-1,3 | Do. |
| 3-methyl-heptadecane-diol-6,7 | Do. |
| 7-chloro-hexadecane-diol-1,8 | Do. |
| 8-ethyl-hexadecane-diol-1,4 | Do. |
| Hexadecane-diol-1,2 | Do. |
| Hexadecane-diol-4,5 | Do. |
| Pentadecane-diol-1,3 | Do. |
| Pentadecane-diol-1,2 | Do. |
| Pentadecane-diol-8,9 | Do. |
| 8-methyl-tetradecane-diol-1,4 | Do. |
| Tetradecane-diol-1,2 | Do. |
| Tetradecane-diol-7,8 | Do. |
| Tridecane-diol-1,2 | Do. |
| Dodecane-diol-1,4 | Do. |
| Dodecane-diol-1,2 | Do. |
| Dodecane-diol-5,6 | Do. |
| 10-chloro-undecane-diol-1,11 | Do. |
| Undecane-diol-1,3 | Do. |
| Undecane-diol-5,6 | Do. |

Instead of the individual compounds of the Formula I to be used according to the invention, mixtures thereof may also be used. This is recommended for compounds of a comparatively low degree of ethoxylation $$(p+q \leq 12),$$

which are advantageously mixed with compounds of a higher degree of ethoxylation $(p+q>15)$, in order to improve their solubility and the stability of the liquor.

The compounds of the Formula I to be used according to the invention can be applied from aqueous solutions or dispersions; from solutions in organic solvents such as alcohols, e.g. ethanol or propanol, acetone, formamide, acetamide, methyl glycol ether, or chlorinated hydrocarbons such as trichloroethylene or tetrachloroethylene; or from emulsions such as are formed from water and a water-immiscible organic solvent. The compounds to be used according to the invention may be present in the emulsions dissolved or dispersed in either phase or in both phases.

Impregnation of the textile materials can be carried out in various ways, for example, by impregnation, immersion or spraying. When the excess of liquor has been removed by squeezing or centrifuging, the impregnated textile materials are dried at elevated temperatures and subsequently subjected to a brief heating at 120 to 200° C. Drying and subsequent heating may also be carried out in a single operation by treating the impregnated materials with hot air or overheated steam. Another possibility consists in performing the subsequent heating in two separate stages as is the case in the permanent press finish.

The amounts to be used in the treatment liquors may vary within wide limits in accordance with the desired finishing effects; quantities of 5 to 100 g. of compound per litre of liquor have proved satisfactory. On the finished textile materials, the quantities of compounds to be used according to the invention should amount to about 0.5 to 10% by weight, referred to the weight of the dry fibres.

The finishing agents to be used according to the invention are well compatible with the majority of conventional finishing agents, such as wetting agents, levelling agents, hydrophobing agents, non-slip agents, plasticisers, optical brightening agents, antistatics and other finishing agents, and they can therefore be used together with these agents in a single bath.

A particularly advantageous method of carrying out the process according to the invention consists in applying the difunctional polyalkylene glycol ether derivatives of the Formula I together with commercial crease-proofing agents. This leads to an increased wash resistance of the finishing effects which can be achieved according to the invention.

The procedure for this preferred method consists in that the compounds of the Formula I to be used according to the invention are added to the treatment liquors prepared according to the usual recipes for crease-proof and permanent press finishes in amounts of 5 to 100 g. per liter of liquor; that the textile materials are impregnated with these liquors in the usual way; and, after pre-drying, are subjected to subsequent heating at temperatures of 120 to 200° C. for a period of time of between 30 seconds and 5 minutes under the conditions required for the crease-proofing agent concerned.

Compounds suitable for the combined process are almost all known nitrogen-containing and nitrogen-free crease-proofing agents from the groups of aminoplast precondensates, aldehydes, aldehyde derivatives, carbamates, epoxy compounds, sulphones and sulphoxides; aminoplast precondensates are especially suitable.

Examples of typical crease-proofing agents from the group of aminoplast precondensates are the hydroxymethyl or alkoxymethyl compounds of urea, alkyl-urea, thiourea, cyclic ureas such as ethylene-urea and propylene-urea, of acetylene-urea, glyoxal-monourein and melamine, and also of compounds from the groups of triazinones and urones.

Other typical representatives are:

from the group of aldehydes: formaldehyde and glyoxal;
from the group of aldehyde derivatives: diethylene glycol acetal, formaldehyde-acrolein condensation products, formaldehyde-acetone condensation products, methylol formamide and N-methylol methacrylamide;
from the group of carbamates: the hydroxymethyl and alkoxymethyl derivatives of carbamic acid butyl ester and the bis-(N-ethyl)-carbamid acid ester of butane-diol-1,4;
from the group of epoxy compounds: epichlorhydrin, ethylene glycol diglycidyl ether, vinyl-cyclohexene dioxide;
from the group of sulphones: the sulphone of the formula $(HOC_2H_4)_2SO_2$.

As catalysts for the aminoplast precondensates, the acids commonly used, such as hydrochloric acid, $H_2SO_4$, $H_3PO_4$, oxalic acid, maleic acid, glycollic acid, chloroacetic acid and tartaric acid, or acid-yielding compounds, such as ammonium chloride, magnesium chloride, zinc nitrate and zinc fluoroborate, are added to the treatment baths in amounts of about 1 to 40 g. per litre of liquor.

The difunctional polyalkylene glycol ether derivatives of the Formula I to be used according to the invention are also suitable for application together with the known ethylenic-unsaturated monomers which can be cross-linked by radiation-chemical means and are suitable for textile finishing.

Ethylenic-unsaturated monomers which can be cross-linked by radiation-chemical means and are suitable for textile finishing are unsaturated bifunctional compounds of various chemical constitutions, e.g. N-methylol- or N-alkoxymethylamides of unsaturated carboxylic acids, such as N-methylol-acrylamide, N,N-dimethylol-acrylamide, N - methylol - methacrylamide, N,N-dimethylol-methacrylamide, N-methoxymethyl-acrylamide, N-methoxyethyl-methacrylamide, N,N-dimethylol - methylene-bis-acrylamide, dihydroxyethyl-bis-acrylamide, N-methylol-crotonic acid amide, maleic acid-N-methylolimide; N-methylol- or N-alkoxymethylamides of unsaturated sulphonic acids, e.g. N-methylol-vinyl-sulphonic acid amide.

Five different methods have hitherto been disclosed for the finishing of textile materials with ethylenic-unsaturated monomers which can be radiation-chemically cross-linked and are suitable for textile finishing:

(1) finishing—dry—irradiation—condensation
(2) finishing—irradiation—drying—condensation
(3) finishing—drying—condensation—irradiation
(4) finishing—drying—condensation—moistening — irradiation
(5) irradiation—finishing—drying—condensation.

The term condensation refers to a heat treatment at temperatures of 120° C. to 200° C. for a period of time of 30 seconds to 5 minutes.

In the case where the finishing agents to be used according to the invention are applied together with the ethylenic-unsaturated monomers which can be radiation-chemically cross-linked and are suitable for textile finishing it has been found that particularly good effects are achieved by working according to method (3) or (4), i.e. by subjecting the textile materials to irradiation only after condensation.

Very good soil-release effects of excellent resistance to washing are obtained in this way.

The process according to the invention is suitable for finishing textile materials produced from natural or synthetic threads or fibres. For example, textile materials consisting of natural or regenerated cellulose such as cotton and rayon; of polyesters such as cellulose 2½-acetate, cellulose triacetate, polyethylene terephthalates or polycyclohexane-dimethylene terephthalate; of synthetic polyamides such as polyhexamethylene-diamine adipate or poly-ε-caprolactam; of natural polyamides such as wool; or of polyacrylonitrile. It has proved particularly satisfactory for the finishing of cotton polyester mixtures. The textile materials may be present in various stages of processing, for example, as fabrics, knitted fabrics, ribbons, fleeces or as ready-made goods.

Textile materials which have been provided with an easy-care or permanent-press finish by means of the finishing agents known from the state of the art have the grave disadvantage that soil, oils and fats cannot be completely washed out. On the one hand, this is due to the fact that the washing temperatures for these textile materials, especially for those containing synthetic fibres, are restricted to low temperatures of about 60° C. On the other hand, the comparatively high resin films on the finished fibre render the release of soil, fats and oils more difficult. In addition to the more difficult soil release there occurs also the soil redeposition during the washing process. In spite of new detergents, it has hitherto not been possible to prevent the re-drawing of soil from the washing liquor (soil redeposition) at the low washing temperatures used for synthetic fibres and mixed fabrics containing such fibres. This effect which is known in the literature as soil redeposition leads in the course of repeated washings to a greying of white fabrics or to a change of shade in colored fabrics. This soil redeposition occurs mainly in the case of crease-proofed cotton/polyester mixed fabrics.

The advantageous effect of the polyalkylene glycol ether derivatives of the Formula I to be used according to the invention consists in that they facilitate the release of soil, oils and fats and strongly reduce the soil redeposition during washing; that they improve the feel of the textile materials without impairing the properties of the fibre and, in the case where they are used together with crease-proofing agents, without adverse effect on the crease-proof finish.

Compared with the products hitherto used for soil release finishing, the compounds to be used according to the invention offer the following advantages:

Compared with products derived from acrylic acid-acrylic acid ester copolymers: they do not give rise to a stiffening or hardening of the feel of the finished textile materials; on the contrary, the compounds to be used according to the invention, have marked plasticizer properties so that the addition of plasticizers which is common use of crease-proof finishing becomes unnecessary. In contrast to the effects achieved with the known plasticizers derived from ethoxylation products, these plasticizer effects are substantially wash-resistant.

With regard to the improvement of the soil-release, oil release and anti-soil redeposition properties, the products to be used according to the invention, when applied in a single bath together with crease-proofing agents, exhibit a superior wash-resistance of the said effects, compared with a corresponding finish with acrylic acid copolymers; this applies particularly and convincingly to the improvement of the anti-soil redeposition properties.

No shifts of shade are caused when dyed goods are finished.

Compared with the known soil release finishing agents derived from polyalkylene glycol ether derivatives, the difunctional polyalkylene glycol ether derivatives to be used according to the invention are characterized by generally better effects, when they are used in combination with crease-proofing agents.

Compared with the very expensive polyalkylene glycol ether derivatives of per-fluorinated aliphatic compounds, the compounds which can be used according to the invention exhibit substantially improved anti-soil redeposition properties.

The test values given in the following examples were determined according to the following test methods.

Instruction for testing the soil release

The fabric to be tested is soiled with 1 ml. of a soil solution the composition and preparation of which are described below, and stored at room temperature in air for 12 hours. The fabric soiled in this way is then washed in a domestic drum washing machine at a temperature of 60° C. with 3 g. of a detergent (Dixan made by the firm Henkel & Cie., Düsseldorf) per litre of wash liquor. After drying, the soil release is evaluated according to the following scale:

Mark 1: soil is not released
Mark 2: soil is badly released
Mark 3: soil is moderately released
Mark 4: soil is well released
Mark 5: soil is very well released Preparation and composition of the soil solution:

20 g. of beef suet are melted and mixed with 30 g. of mineral oil (spindle oil). 60 g. of a street dust imitation are stirred into this mixture which is then made up with trichloroethylene to a volume of 1 litre. The street dust imitation is composed as follows:

|  | G. |
|---|---|
| Chamotte light | 1,932 |
| Iron oxide black F 316 (Farbenfabriken Bayer) | 40 |
| Iron oxide yellow 920 (Farbenfabriken Bayer) | 20 |
| Carbon black | 8 |
|  | 2,000 |

Instruction for testing the release of mineral oil stains according to the Deering-Milliken test method (oil release)

4 drops of mineral oil are allowed to drop from a burette on to a glass plate from a height of 7.5 cm. The oil is allowed to spread for 15 seconds, and the fabric to be tested is then carefully placed on the oil stain. The time of residence amounts to 60 seconds. The fabric is subsequently placed on a polyethylene foil, the oil stain is covered with filter paper. A weight of 2 kg. is placed on top for 30 seconds. The sample soiled in this way is subsequently suspended at room temperature for 30 minutes. The sample is then washed once at 60° C. in a domestic washing machine with 3 g./litre of a detergent (Dixan made by Henkel & Cie., Düsseldorf) and subsequently dried.

The release of the oil stain is evaluated with the use of the photographic standard according to Deering-Milliken under skylight illumination. The evaluation ranges from mark 1 to mark 5, mark 1 indicating no oil release and mark 5 denoting complete oil release.

Instruction for testing the re-drawing of soil from the washing liquor (soil redeposition)

The fabrics to be tested are treated in a liquor ratio of 1:50 for about 15 minutes at 60° C. with a washing liquor containing, per litre, 2 g. of a detergent (Dixan made by Henkel & Cie., Düsseldorf) in dissolved form as well as 0.5 g. of carbon black in finely dispersed form. After the aforesaid period of time, the test fabrics are rinsed in running cold water and dried in the usual way.

Evaluation is carried out by means of the grey scale for evaluating the bleeding of dyestuffs (according to instructions DIN 54,002 and SNV 95,806); mark 1 refers to the least satisfactory, mark 5 to the best evaluation.

EXAMPLE 1

A fabric of polyester fibres is impregnated on a foulard with an aqueous solution containing, per litre, 40 g. of the ethoxylation product obtained by the reacting of 1 mol octadecane-diol-1,12 with 20 mol ethylene oxide.

The liquor absorption amounts to 55%, referred to the weight of the air-dry fabric. The impregnated fabric is dried at 90° C. for 5 minutes and subsequently further heated at 180° C. for 30 seconds.

As can be seen from the following table, the fabric finished in this way exhibits substantially improved anti-soil redeposition properties.

SOIL REDEPOSITION TEST

|  |  | After 5 machine washings |
|---|---|---|
| Untreated fabric | 1.5 | 2.25 |
| Treated fabric | 4.0 | 4.5 |

The five washings of the fabric for the purpose of testing the wash resistance of the finish were carried out in a drum washing machine at 60° C. with a washing liquor containing 2 g. of a commercial detergent ("Dixan" made by Henkel & Cie) per litre of washing liquor.

Very good anti-soil redeposition effects were also achieved on the polyester fabric under the above finishing conditions, when the ethoxylation product used above was replaced with the same amount of one of the products described below:

(a) mixture of 4 parts by weight of ethoxylated octadecane-diol-1,12 (19 mol ethylene oxide per mol diol) and 1 part by weight of ethoxylated octadecane-(9, 10)-diol-1,12 (19 mol ethylene oxide per mol diol);

(b) ethoxylated eicosane-diol-1,4 (22 mol ethylene oxide per mol diol);

(c) ethoxylated n-octadecane-diol-1,4 (18 mol ethylene oxide per mol diol);

(d) ethoxylated iso-dodecane-diol-1,4 (16 mol ethylene oxide per mol diol); the 1,12-diols were prepared by hydrogenation of ricinoleic acid, the 1,4-diols by radical addition of butane-diol-1,4 on to the corresponding α-olefines;

(e) ethoxylated 9-chloro-octadecane-diol-1,10 (21 mol ethylene oxide per mol diol); the diol was prepared from 9,10-epoxy-octadecane-diol-1;

(f) ethoxylated (12 - hydroxy-octadecyl)-(3-chloro-2-hydroxy-propyl) ether (18 mol ethylene oxide per mol diol); the diol was prepared from 12-hydroxy-octadecanol-1 and epichlorohydrin;

(g) ethoxylated 1-chloro-octadecane-diol-9,10 (20 mol ethylene oxide per mol diol); the diol was prepared from 1-chloro-9,10-epoxy-octadecane.

EXAMPLE 2

A polyamide knitted fabric is impregnated on a foulard with a liquor containing, per litre, 25 g. of a mixture of 3 parts by weight of ethoxylated octadecane-diol-1,12 (12 mol ethylene oxide per mol diol) and 1 part by weight of ethoxylated octadecane-diol-1,12 (20 mol ethylene oxide per mol diol).

The liquor absorption amounts to 55%, referred to the weight of the air-dry knitted fabric. The impregnated knitted fabric is dried at 90° C. and subsequently further heated at 130° C. for 2 minutes. The fabric finished in this way is characterized by very good anti-soil redeposition properties.

Very good anti-soil redeposition effects were likewise achieved, when the mixture used above was replaced with the same amount of one of the products described below:

(a) alkoxylated octadecane-diol-1,12, prepared by the reaction of 1 mol octadecane-diol-1,12 with 2 mol propylene oxide and reaction of the propoxylation product with 22 mol ethylene oxide;

(b) mixture of 4 parts by weight of ethoxylated glycerol-mono-stearate (16 mol ethylene oxide per mol diol) and 1 part by weight of ethoxylated glycerol monolaurate (16 mol ethylene oxide per mol diol);

(c) ethoxylated gycerol monostearyl carbamate (16 mol ethylene oxide per mol diol); the diol was prepared from glycerol and stearyl isocanate;

(d) ethoxylated 12-hydroxy-stearic acid monoethylene glycol ester (18 mol ethylene oxide per mol diol);

(e) ethoxylated N-palmitoyl-N-ethyl-N-(2,3-dihydroxy-propyl)-amine (35 mol ethylene oxide per mol diol).

EXAMPLE 3

A fabric of 67% polyester fibres and 33% staple fibre is impregnated on a foulard with a liquor containing, per litre, 200 g. dimethylol-dihydroxy-ethylene-urea (DMDHEU),
25 g. magnesium chloride·6H$_2$O and
50 g. of a mixture of 3 parts by weight of ethoxylated octadecane-diol-1,12 (12 mol ethylene oxide per mol diol) and 1 part by weight of ethoxylated octadecane-diol-1,12 (20 mol ethylene oxide per mol diol), and squeezed to a liquor absorption of 60%. The fabric is subsequently dried at 110° C. and further heated at 150° C. for 4 minutes.

In order to achieve a permanent press effect, the fabric treated in this way is pressed in a hot head press by the following method:

(1) steaming—5 seconds in the closed press
(2) pressing—15 seconds, temperature 180° C. pressure 500 g./sq. cm. in the closed press
(3) suction—10 seconds in the open press.

The fabric finished in this way is subjected to the tests for soil release, soil redeposition and oil release described above. The properties of the feel are also evaluated.

For comparison serve an untreated fabric and a fabric which has only been finished with the stated amounts of di-methylol-dihydroxy-ethylene-urea and magnesium chloride under the same conditions.

The wash resistance of the finish was tested after 5 and 10 machine washings. The washings were carried out at 60° C. with a washing liquor containing, per litre, 2 g. of a detergent.

|  | Soil release test | | | Soil redeposition test | | | Oil release test | | |
|---|---|---|---|---|---|---|---|---|---|
|  | After 5 machine washings | | After 10 machine washings | After 5 machine washings | | After 10 machine washings | After 5 machine washings | | After 10 machine washings |
| Untreated fabric | 2.0 | 2.5 | | 2.5 | 2.75 | 2.75 | 3.0 | 3.5 | 3.5 | 3.75 |
| Treated fabric with DMDHEU plus MgCl₂·6H₂O | 1.75 | 1.75 | | 2.0 | 1.75 | 1.75 | 2.25 | 2.75 | 3.0 | 3.0 |
| Treated fabric with DMDHEU plus MgCl₂·6H₂O plus diol-eo-products | 4.75 | 4.75 | | 4.75 | 4.5 | 4.5 | 4.5 | 3.75 | 4.0 | 4.25 |

(Note: table columns as printed — values: Untreated 2.0 2.5 | 2.5 2.75 2.75 3.0 | 3.5 3.5 3.75; Treated DMDHEU+MgCl₂ 1.75 1.75 | 2.0 1.75 1.75 2.25 | 2.75 3.0 3.0; Treated with diol 4.75 4.75 | 4.75 4.5 4.5 4.5 | 3.75 4.0 4.25)

Feel: The fabric finished with the diol-ethoxylation products to be used according to the invention exhibits a softer feel than the fabric finished only with DMDHEU and magnesium chloride under otherwise equal conditions.

Equally satisfactory soil release, anti-soil redeposition and feel effects were achieved when the mixture used above was replaced with the same amount of one of the products described below:

(a) dimethylol compound of the ethoxylation product obtained by the reaction of 1 mol octadecane-diol-1,12 with 16 mol ethylene oxide;

(b) monoacetic acid ester of the ethoxylation product obtained by the reaction of 1 mol octadecane-diol-1,12 with 16 mol ethylene oxide; the ester is prepared by acylation of 1 mol of the ethoxylation product with 1 mol acetic acid anhydride;

(c) mono-glyoxal semiacetal of the ethoxylation product obtained by the reaction of 1 mol hexadecane-diol-1,12 with 14 mol ethylene oxide; the semiacetal is prepared by the reaction of 1 mol of the ethoxylation product with 1 mol glyoxal;

(d) monoformic acid ester of the ethoxylation product obtained by the reaction of 1 mol hexadecane-diol-1,4 with 14 mol ethylene oxide; the ester is prepared by the reaction of 1 mol of the ethoxylation product with 1 mol chloroformic acid ethyl ester;

(e) ethoxylated hexadecane-$\alpha,\beta$-diol mixture (16 mol ethylene oxide per mol of diol mixture); the mixture of hexadecane-$\alpha,\beta$-diols was prepared by epoxidation of a technical hexadecene mixture.

EXAMPLE 4

A cotton poplin fabric is treated on a foulard with a liquor containing, per litre, 150 g. dimethylol-ethylene-urea (DMEU)
15 g. MgCl₂·6H₂O
40 g. of the mixture of diol-ethoxylation products used in Example 1 until the liquor absorption is 80%. The fabric is subsequently dried at 90° C. and condensed at 150° C. for 5 minutes.

The fabric treated in this way was subjected to the tests for soil release, soil redeposition and wash resistance of the finish as described in Example 3. For comparison served an untreated fabric and a fabric treated only with the stated amounts of dimethylol-ethylene-urea and magnesium chloride.

The results of these tests are assembled in the following tables:

|  | Soil release test | | |
|---|---|---|---|
|  | After 5 machine washings | | After 10 machine washings |
| Untreated fabric | 3.0 | 3.25 | 3.25 |
| Treated fabric with DMEU plus MgCl₂·6H₂O | 2.0 | 2.5 | 2.5 |
| Treated fabric with DMEU plus MgCl₂·6H₂O plus diol-eo-products | 4.75 | 4.5 | 4.5 |

EXAMPLE 5

A poplin shirting of 50% polyester and 50% cotton (fabric weight 110 g./sq. m.) is impregnated in a liquor consisting of 150 g./litre dimethylol dihydroxy-ethylene-urea (DMDHEU)
15 g./litre magnesium chloride·6H₂O
40 g./litre of the mixture of diol-ethoxylation products described in Example 3, squeezed to a liquor absorption of 60%, subsequently dried at 90° C. for 5 minutes and further heated at 150° C. for 4 minutes.

The finished fabric was subjected to the tests for soil release, soil redeposition and wash resistance of the finish, as described in Example 3.

For comparison served an untreated fabric and a fabric treated only with the stated amounts of dimethylol-di-hydroxyethylene-urea and magnesium chloride.

The results of these tests are assembled in the following tables.

|  | Soil release test | |
|---|---|---|
|  | After 5 machine washings | After 10 machine washings |
| Untreated fabric | 3.0 | 3.5 | 3.5 |
| Treated fabric with DMDHEU plus MgCl₂·6H₂O | 1.0 | 1.5 | 2.0 |
| Treated fabric with DMDHEU plus MgCl₂·6H₂O plus diol-eo-product | 4.75 | 4.5 | 4.5 |

|  | Soil redeposition test | |
|---|---|---|
|  | After 5 machine washings | After 10 machine washings |
| Untreated fabric | 3.0 | 3.6 | 3.8 |
| Treated fabric with DMDHEU plus MgCl₂·6H₂O | 2.5 | 3.0 | 3.25 |
| Treated fabric with DMDHEU plus MgCl₂·6H₂O plus diol-eo-product | 4.5 | 4.75 | 4.75 |

Feel: The fabric finished with the diol-ethoxylation product to be used according to the invention exhibits a softer feel than the fabric finished only with DMDHEU and magnesium chloride under otherwise equal conditions.

A poplin fabric with an equally satisfactory finish was obtained when the mixture used above was replaced with the same amount of one of the products described below:

(a) mixture of equal parts by weight of ethoxylated octadecane-diol-1,2 (20 mol ethylene oxide per mol diol) and ethoxylated hexadecane-diol-1,2 (4 mol ethylene oxide per mol diol);
(b) ethoxylated $C_{12}$-$C_{20}$-alkane-diol-1,2 mixture (16 mol ethylene oxide per mol of diol mixture); the diol was prepared by epoxidation of a technical $C_{12}$-$C_{20}$-$\alpha$-olefine mixture;
(c) ethoxylated (12-hydroxy-octadecyl)-(3-chloro-2-hydroxypropyl)-ether (16 mol ethylene oxide per mol diol);
(d) ethoxylated N-(12 - hydroxy-stearoyl)-N-propyl-N-(2-hydroxyethyl)-amine (16 mol ethylene oxide per mol diol).

EXAMPLE 6

A shirting consisting of 50% polyester and 50% cotton is impregnated on a foulard with a liquor containing, per litre, 150 g. dimethylol dihydroxy-ethylene-urea
15 g. magnesium chloride·$6H_2O$
45 g. of the mixture of diol-ethoxylation products used in Example 3 and
5 g. of an optical brightening agent of the formula

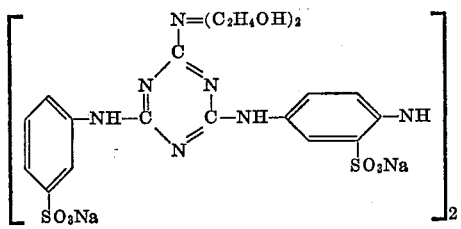

The impregnated fabric is squeezed to a liquor absorption of 55%, dried at 110° C. and then further heated at 150° C. for 5 minutes.

A second sample of the same fabric is finished in the same way but this time without the addition of the diol-ethoxylation products.

From the two fabrics finished in this way there were made men's shirts the wearing properties of which were tested in a comparative wearing test.

This wearing test served to determine the degree of whiteness of the shirts, i.e. the degree of whiteness of the unwashed shirts at the start of the test and the degree of whiteness of the shirts at the end of the test after 15 washings. The degree of whiteness was determined with an Elrepho measuring apparatus.

The wearing test was carried out as follows:

The shirt provided with a crease-proof finish without the addition of the ethoxylation products and the shirt provided with a crease-proof finish with the addition of the ethoxylation products were each worn by one person on alternating days for several weeks. After each wearing, the shirts were washed in the usual way in a domestic washing machine at 60° C. with a liquor containing, per litre, 3 g. of a detergent (Dixan made by Henkel & Cie).

Each shirt was worn for 15 days in all and washed 15 times. The measuring of the degree of whiteness at the end of the test showed that the shirts provided with a crease-proof finish with the addition of the ethoxylation products had greyed to a substantially lesser degree than those finished without the addition of the ethoxylation products.

EXAMPLE 7

A fabric of 50% polyester and 50% cotton is impregnated with a liquor containing, per litre, 150 g. N-methylol-acrylamide (NMA)
40 g. magnesium chloride·$6H_2O$
40 g. of a mixture of 3 parts by weight of ethoxylated octadecane-diol-1,12 (12 mol ethylene oxide per mol diol) and 1 part by weight of ethoxylated octadecane-diol-1,12 (20 mol ethylene oxide per mol diol)

and squeezed to a liquor absorption of 85%, subsequently dried at 110° C. and condensed at 165° C. for 5 minutes. The subsequent irradiation with a dose of 1 mrad is carried out once immediately after condensation and once after an intermediate wet treatment (moistening to a moisture content of 80%).

Moreover, a fabric sample impregnated with the above liquor and dried is first irradiated and subsequently condensed at 165° C. for 5 minutes.

The soil release, soil redeposition and oil release properties of the fabric samples finished by means of the three different methods were tested.

For comparison served on untreated fabric and fabric samples which were only treated with the stated amounts of NMA and magnesium chloride with the use of the three methods described above.

| Method | | Soil release test | | Soil redeposition test | | Oil release test | |
|---|---|---|---|---|---|---|---|
| | | Immediately | After 5 machine washings | Immediately | After 5 machine washings | Immediately | After 5 machine washings |
| Finishing-drying-irradiation-condensation | Untreated fabric | 2.0 | 1.5 | 3.0 | 3.6 | 4.2 | 4.2 |
| | NMA plus $MgCl_2·6H_2O$ | 2.0 | 2.0 | 3.0 | 4.0 | 3.5 | 3.0 |
| | NMA plus $MgCl_2·6H_2O$ plus diol-eo-product | 2.0 | 2.0 | 3.0 | 4.3 | 3.7 | 3.5 |
| Finishing-drying-condensation-irradiation | NMA plus $MgCl_2·6H_2O$ | 2.0 | 1.0 | 2.0 | 3.0 | 3.0 | 3.5 |
| | NMA plus $MgCl_2·6H_2O$ plus diol-eo-product | 5.0 | 4.0 | 3.5 | 3.3 | 3.7 | 4.7 |
| Finishing-drying-condensation-moistening-irradiation | NMA plus $MgCl_2·6H_2O$ | 5.0 | 5.0 | 1.7 | 2.7 | 3.7 | 4.2 |
| | NMA plus $MgCl_2·6H_2O$ plus diol-eo-product | 5.0 | 5.0 | 2.7 | 3.3 | 4.0 | 4.5 |

The irradiations were carried out in a plant of the firm High Voltage Engineering in Amersfoort, Holland with an acceleration voltage of 500,000 ev. The doses amounted to between 0.5 and 8 mrad, the current strength to between 0.5 and 18 ma.

EXAMPLE 8

A popular trousering consisting of 70% polyester and 30% staple fibre is impregnated on a foulard with an aqueous liquor containing, per litre, 150 g. methylol-acrylamide (NMA)
40 g. magnesium chloride·$6H_2O$
40 g. of a mixture of 3 parts by weight of ethoxylated oxtadecane-diol-1,12 (12 mol ethylene oxide per mol diol) and 1 part by weight of ethoxylated octadecane-diol-1,12 (20 mol ethylene oxide per mol diol)

(liquor absorption 85%). The fabric is dried at 110° C., condensed at 165° C. for 5 minutes, and irradiated with a dose of 1 mrad in the dry and in the wet state (80% moisture content). In addition, the process where the dry irradiation takes place before condensation is again carried out.

The samples finished in this way are subjected to the soil release test. For comparison serve an untreated fabric and fabric samples which have only been finished with the stated amounts of NMA and magnesium chloride with the use of the three methods described above. The results are listed in the following table:

| Method | | Soil release test, immediately |
|---|---|---|
| | Untreated fabric | 2.0 |
| Finishing-drying-irradiation-condensation. | NMA plus MgCl₂·6H₂O | 2.5 |
| | NMA plus MgCl₂·6H₂O plus diol-eo-product. | 2.5 |
| Finishing-drying-condensation-irradiation. | NMA plus MgCl₂·6H₂O | 2.5 |
| | NMA plus MgCl₂·6H₂O plus diol-eo-product. | 5.0 |
| Finishing-drying-condensation-moistening-irradiation. | NMA plus MgCl₂·6H₂O | 4.0 |
| | NMA plus MgCl₂·6H₂O plus diol-eo-product. | 5.0 |

We claim:
1. In the known process for the finishing of textile material by impregnating with solution or dispersion of textile treating agent, drying the impregnated textile material, and subsequently subjecting the dried material to a brief heat treatment at a temperature from 100° C. to 200° C.; the improvement consisting of using as the textile treating agent 0.5% to 10% by weight of the dry finished textile material of a difunctional polyalkylene glycol ether derivative of the formula

$$R_2O-\left(\begin{array}{c}CH-CH_2-O\\|\\X_1\end{array}\right)_p-R_1-\left(\begin{array}{c}O-CH_2-CH\\|\\X_2\end{array}\right)_q-OR_3$$

in which
$R_1$ is a bivalent radical of an aliphatic diol of the formula

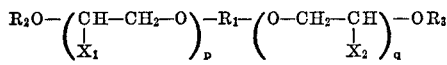

in which Y is —CH₂—, —CH=CH—, —O—, —CO—O—, —CO—NH—, —CO—N(CH₃)— —CO—N(C₂H₅)—, —CO—N(C₃H₇)—, or —NH—CO—O—, m and n independently of one another stand for any number from 0 to 20, with the total of $m+n$ being from 8 to 20;
$X_1$ and $X_2$ are hydrogen;
$R_2$ and $R_3$, independently of one another, are hydrogen or an organic radical which contains 1 to 3 carbon atoms and can be split off by acidic hydrolysis; and $p$ and $q$, independently of one another, stand for any number from 0 to 50, with the total of $p+q$ being from 4 to 50.

2. Process according to claim 1, in which $R_2$ and $R_3$, independently of one another, stand for a hydrogen atom or a methylol group; the sum total of $p+q$ amounts to 4 to 35; and $R_1$ stands for the bivalent radical of an aliphatic diol of the formula

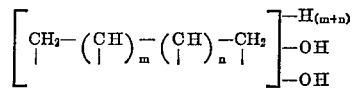

in which m and n, independently of one another, stand for a number from 0 to 20, with the proviso that the sum total of m and n amounts to 8 to 20.

3. Process according to claim 1 characterized in that the ethoxylation products of technical octadecane-diol-1,12 with 4 to 35 mol ethylene oxide are used as difunctional polyalkylene glycol ether derivatives.

4. Process according to claim 1 characterized in that the ethoxylation products of C₁₂–C₂₀-alkane-diol-1,2 mixtures with 4 to 35 mol ethylene oxide are used as difunctional polyalkylene glycol ether derivatives.

5. Process according to claim 1 characterized in that the difunctional polyalkylene glycol ether derivatives are used in an amount of 5 to 100 g. per litre of impregnating liquor.

6. Process according to claim 1 characterized in that the solutions or dispersions contain, in addition to the difunctional polyalkylene glycol ether derivatives, crease-profing agents and the catalysts therefor.

7. Process according to claim 1 characterized in that the difunctional polyalkylene glycol ether derivatives are used together with ethylenic-unsaturated monomers which can be cross-linked by radiation-chemical means and are suitable for textile finishing.

8. The process of claim 1 wherein $R_2$ and $R_3$ are hydrogen or methylol; and $p+q$ is from 4 to 35.

9. Process according to claim 6 characterized in that the crease-proofing agents are used in an amount of 10 to 200 g. per litre of impregnating liquor and the catalysts in an amount of 2 to 40 g. per litre of impregnating liquor.

10. Process according to claim 7 characterized in that N-methylol-acrylamide is used as the ethylenic-unsaturated monomer which can be cross-linked by radiation-chemical means and is suitable for textile finishing.

11. Textile materials which have been treated by the process of claim 1.

References Cited
UNITED STATES PATENTS

| 3,027,387 | 3/1962 | Albrecht | 117—139.5 CQ |
| 2,671,811 | 3/1954 | Baird et al. | 260—615 B |
| 3,380,925 | 4/1968 | Blaser et al. | 260—615 B |
| 2,010,726 | 8/1935 | Kirstahler | 260—615 B |
| 3,377,249 | 4/1968 | Marco | 8—115.6 |
| 3,399,073 | 8/1968 | Caldwell et al. | 117—138.8 F |
| 3,400,187 | 9/1968 | Farrow | 117—138.8 F |
| 2,920,980 | 1/1960 | Mooberry | 117—138.8 F |

FOREIGN PATENTS

| 1,233,330 | 5/1971 | Great Britain. |

WILLIAM D. MARTIN, Primary Examiner

T. G. DAVIS, Assistant Examiner

U.S. Cl. X.R.

117—93.1 R, 138.8 F, 138.8 N, 139.4, 143 R

UNITED STATES PATENT OFFICE
CERTIFICATE OF CORRECTION

Patent No. 3,799,801          Dated March 26, 1974

Inventor(s) HELMUT KIRSCHNEK ET AL.

It is certified that error appears in the above-identified patent and that said Letters Patent are hereby corrected as shown below:

Column 1, line 17, "finshing" should read --- finishing --- line 30, "difuuctional" should read

--- difunctional ---.

formula (I) the left $R_1$ should read $X_1$ .

Column 2, line 8, "$C_2H_1$" should read --- $C_2H_5$ ---.

line 17, "octadecane-(9,10)" should read

--- octadecene ---.

line 36, "alkane-trils" should read --- triols ---.

line 45, "of a" should read --- or a ---.

line 60, "$C_2H_7$" should read --- $C_3H_7$ ---.

Column 8, line 10, "octadecane-(9," should read

--- octadecene-(9, ---.

Column 11, line 32, " 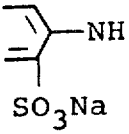 " should read

--- 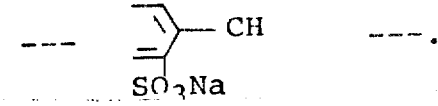 ---.

Signed and sealed this 19th day of November 1974.

(SEAL)
Attest:

McCOY M. GIBSON JR.          C. MARSHALL DANN
Attesting Officer            Commissioner of Patents